United States Patent [19]

Fisher et al.

[11] Patent Number: 4,791,537

[45] Date of Patent: Dec. 13, 1988

[54] VEHICLE ACCESSORY ASSEMBLY WITH SLIDING DOOR FOR MOUNTING ON A VISOR OR OTHER INTERIOR PANEL

[75] Inventors: Robert C. Fisher, Rochester; Mark Lobanoff, Troy; Michael P. Brennan, Rochester Hills, all of Mich.

[73] Assignee: Irvin Industries, Inc., Rochester Hills, Mich.

[21] Appl. No.: 30,385

[22] Filed: Mar. 26, 1987

Related U.S. Application Data

[63] Continuation-in-part of Ser. No. 13,656, Feb. 12, 1987, Pat. No. 4,721,310, which is a continuation-in-part of Ser. No. 7,120, Jan. 26, 1987, which is a continuation-in-part of Ser. No. 795,520, Nov. 6, 1985, Pat. No. 4,681,366, which is a continuation-in-part of Ser. No. 746,676, Jun. 20, 1985, abandoned, which is a continuation-in-part of Ser. No. 627,280, Jul. 2, 1984, abandoned.

[51] Int. Cl.⁴ .............................................. F21V 33/00
[52] U.S. Cl. ..................................... 362/135; 362/140
[58] Field of Search .................. 362/32, 140, 136, 135, 362/31, 61

[56] References Cited

U.S. PATENT DOCUMENTS

| | | |
|---|---|---|
| 876,039 | 1/1908 | Burrell . |
| 1,530,162 | 3/1925 | Foreman . |
| 1,576,793 | 3/1926 | Sadler . |
| 1,905,868 | 4/1933 | Hein . |
| 2,097,419 | 10/1937 | Schmidt . |
| 2,123,319 | 7/1938 | Thompson . |
| 2,148,557 | 2/1939 | Hook . |
| 2,268,189 | 12/1941 | Colbert . |
| 2,466,454 | 4/1949 | Logan . |
| 2,506,689 | 5/1950 | Simpson et al. . |
| 2,640,909 | 6/1953 | Montgomery . |
| 2,844,200 | 7/1958 | Herr et al. . |
| 3,211,903 | 10/1965 | McElreath . |
| 3,305,679 | 2/1967 | Barcita-Peruchena . |
| 3,343,867 | 9/1967 | Couch et al. . |
| 3,375,364 | 3/1968 | Marcus ............................. 362/140 |
| 3,542,416 | 11/1970 | Nelson . |
| 3,546,438 | 12/1970 | Buc et al. ............................ 362/31 |
| 3,576,409 | 4/1971 | Fiddler . |
| 3,610,680 | 10/1971 | Brady . |
| 3,641,334 | 2/1972 | Kipping . |

(List continued on next page.)

FOREIGN PATENT DOCUMENTS

| | | |
|---|---|---|
| 0053663 | 6/1982 | European Pat. Off. . |
| 0196961 | 10/1986 | European Pat. Off. . |
| 1032112 | 6/1958 | Fed. Rep. of Germany . |
| 2027386 | 12/1971 | Fed. Rep. of Germany . |
| 2220711 | 11/1973 | Fed. Rep. of Germany . |
| 3324169 | 1/1985 | Fed. Rep. of Germany . |
| 1143365 | 9/1957 | France . |
| 1402144 | 5/1965 | France . |
| 2429685 | 1/1980 | France . |
| 2431932 | 2/1980 | France . |
| 2483858 | 6/1980 | France . |
| 2453042 | 10/1980 | France . |
| 59-20724 | 2/1984 | Japan . |
| 817159 | 7/1959 | United Kingdom . |
| 854938 | 11/1960 | United Kingdom . |
| 999331 | 7/1965 | United Kingdom . |
| 1043087 | 9/1966 | United Kingdom . |
| 1214327 | 12/1970 | United Kingdom . |
| 1327985 | 8/1973 | United Kingdom . |

Primary Examiner—Charles J. Myhre
Assistant Examiner—David A. Okonsky
Attorney, Agent, or Firm—Harness, Dickey & Pierce

[57] ABSTRACT

A vehicle accessory assembly is disclosed for mounting on an interior panel, such as on a visor, for example, and includes an accessory devce, such as a vanity mirror assembly, interconnected with the visor or other vehicle panel at a generally fixed location thereon. A preferred laterally sliding accessory door is interconnected with the visor or other interior panel for selective lateral movement between a closed position wherein the accessory device is substantially covered and an open position wherein the accessory device is substantially exposed. Preferably, a switch is provided for electrically energizing a light or other electrical component in response to movement of the accessory door from its closed to its open position, and a manually operable override feature is also preferably provided in the event that the user wishes to disable the switch and prevent such energization in response to the opening movement of the door. In addition, the assembly can also be provided with other features, such as a disconnect switch that disconnects the electrical system of the accessory assembly whenever the visor or other vehicle panel is moved to a predetermined position.

20 Claims, 3 Drawing Sheets

U.S. PATENT DOCUMENTS

| | | | |
|---|---|---|---|
| 3,751,106 | 8/1973 | Mahler et al. | |
| 3,752,974 | 8/1973 | Baker et al. | 362/31 |
| 3,794,828 | 2/1974 | Arpino | |
| 3,843,236 | 10/1974 | Kurz, Jr. | |
| 3,871,703 | 3/1975 | Accatino | |
| 3,926,470 | 12/1975 | Marcus | |
| 4,000,404 | 12/1976 | Marcus | |
| 4,068,930 | 1/1978 | Marcus | |
| 4,075,468 | 2/1978 | Marcus | |
| 4,146,762 | 3/1979 | Peck et al. | |
| 4,174,864 | 11/1979 | Viertel et al. | |
| 4,203,149 | 5/1980 | Viertel et al. | |
| 4,227,241 | 10/1980 | Marcus | |
| 4,241,383 | 12/1980 | Shea | 362/135 |
| 4,272,118 | 6/1981 | Viertel et al. | |
| 4,277,817 | 7/1981 | Hehr | 362/31 |
| 4,353,592 | 10/1982 | Cziptschirsch | |
| 4,363,511 | 12/1982 | Viertel et al. | |
| 4,364,597 | 12/1982 | Viertel et al. | |
| 4,373,282 | 2/1983 | Wragg | 362/31 |
| 4,378,129 | 3/1983 | Kaiser et al. | |
| 4,421,355 | 12/1983 | Marcus | |
| 4,453,200 | 6/1984 | Trcka et al. | 362/31 |
| 4,479,172 | 10/1984 | Connor | |
| 4,486,819 | 12/1984 | Marcus et al. | 362/144 |
| 4,491,899 | 1/1985 | Fleming | |
| 4,494,789 | 1/1985 | Flowerday | |
| 4,518,192 | 5/1985 | Canadas et al. | |
| 4,521,051 | 6/1985 | Cody et al. | |
| 4,564,234 | 1/1986 | Kaiser et al. | |
| 4,624,499 | 11/1986 | Flowerday | 362/144 |
| 4,648,011 | 3/1987 | Boote et al. | 362/144 |
| 4,652,982 | 3/1987 | Flowerday | |
| 4,653,793 | 3/1987 | White et al. | |
| 4,683,522 | 7/1987 | Viertel et al. | 362/140 |

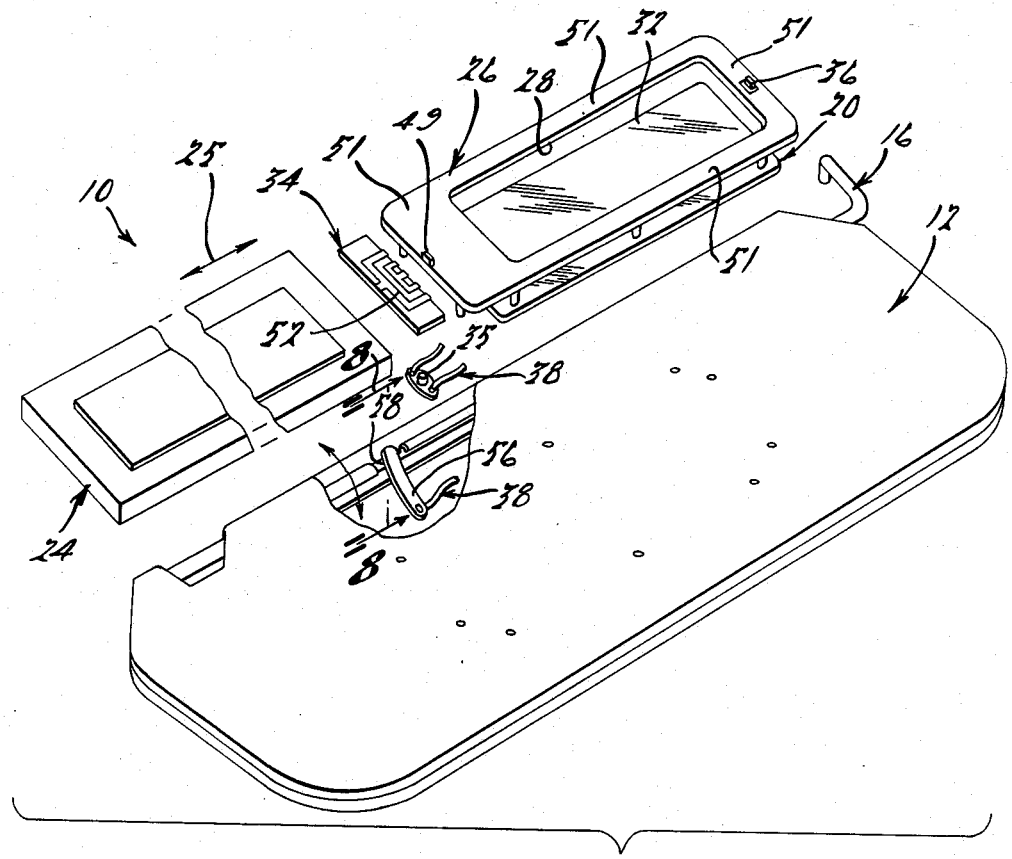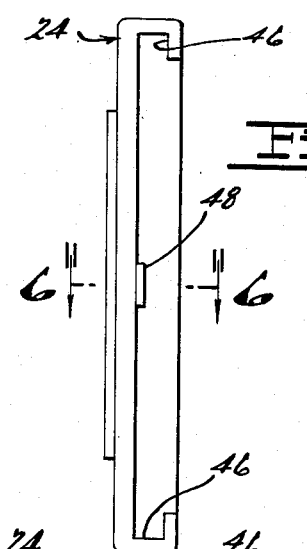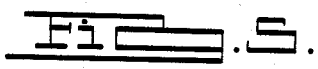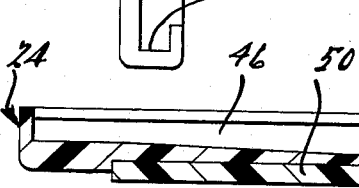

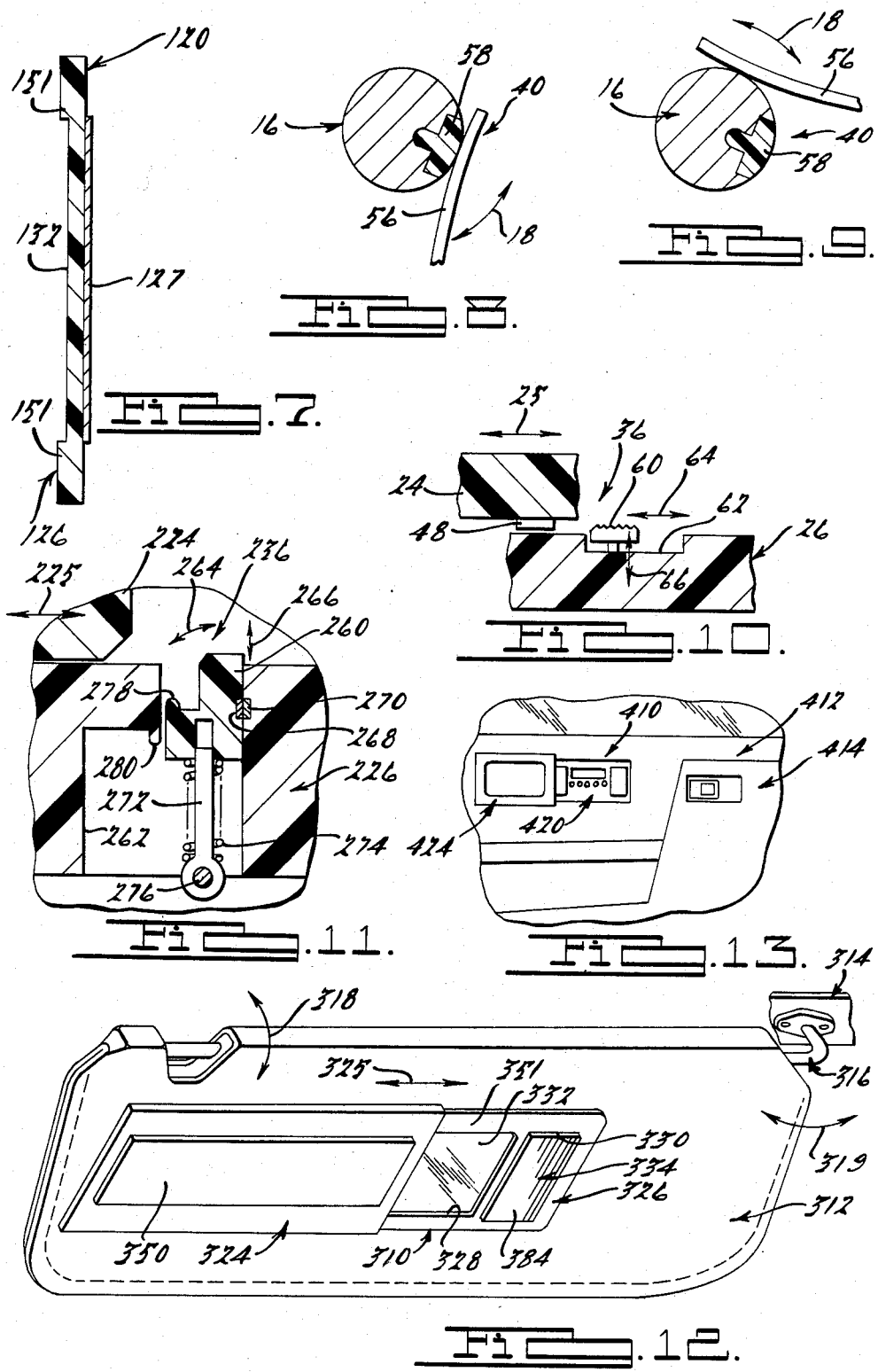

VEHICLE ACCESSORY ASSEMBLY WITH SLIDING DOOR FOR MOUNTING ON A VISOR OR OTHER INTERIOR PANEL

CROSS-REFERENCE TO RELATED APPLICATIONS

This is a continuation-in-part of a copending application for U.S. patent, Ser. No. 013,656, filed Feb. 12, 1987, entitled VEHICLE ACCESSORY ASSEMBLY FOR MOUNTING ON A VISOR OR OTHER INTERIOR PANEL and now U.S. Pat. No. 4,721,310, which is a continuation-in-part of a copending application for U.S. patent, Ser. No. 007,120, filed Jan. 26, 1987, entitled VEHICLE ACCESSORY ASSEMBLY, which is a continuation-in-part of a copending application for U.S. patent, Ser. No. 795,520, filed Nov. 6, 1985 and now U.S. Pat. No. 4,681,366, which is a continuation-in-part of an application for U.S. patent, Ser. No. 746,676, filed June 20, 1985 (now abandoned), which was in turn a continuation-in-part of an application for U.S. patent, Ser. No. 627,280, filed July 2, 1984 (now abandoned), and all of said applications are expressly incorporated herein by reference.

BACKGROUND AND SUMMARY OF THE INVENTION

The present invention relates generally to various vehicle accessory assemblies, including vanity mirror assemblies, mirror and light assemblies, and the like, and more particularly to such accessory assemblies adapted for mounting on a vehicle visor, or on other vehicle interior panels.

Automotive vehicle visors having lighted vanity mirrors are well-known in the art. Such vanity mirrors are normally located on the side of the visor facing the passenger when the visor is in a lowered position and frequently have hinged doors that pivot toward and away from the visor and thus require a relatively large amount of opening space. Typically such devices can be adjusted to the desired reflecting angle through adjustment of the visor, or by adjustment of the angle of the mirror relative to the visor. These vanity mirror assemblies, as well as various lights and/or other vehicle accessories, are frequently provided for the comfort and convenience of forward seat passengers.

Many of the previous vehicle accessory assemblies mentioned above have performed well and have added to the convenience, comfort, and attractiveness of vehicle interiors in which they have been employed. However, it is an object of the present invention to improve even further on the utility and attractiveness of such vehicle accessory assemblies by providing a neat, attractive, up-scaled accessory assembly, which can incorporate a vanity mirror, a vanity mirror and light, or other vehicle accessory arrangements.

A further object of the present invention is to provide a vanity or other accessory assembly with a non-pivoting door, which does not therefore require the amount of opening space that is needed for operating an outwardly-pivoting, hinged door.

Another object of the present invention is to provide such a vehicle accessory assembly that is relatively simple and inexpensive to manufacture and install, either as standard or optional equipment on a vehicle, and that provides a substantial improvement in consumer-perceived quality.

According to the present invention, a vehicle accessory assembly adapted for mounting on an interior panel, such as on a visor, for example, includes an accessory device, such as a vanity mirror or mirror-and-light assembly, interconnected with the visor or other vehicle panel at a generally fixed location thereon. A preferred laterally sliding accessory door is interconnected with the vehicle visor or other interior vehicle panel for selective lateral movement between a closed position wherein the accessory device is substantially covered and an open position wherein the accessory device is substantially exposed. A switch device is preferably provided for electrically energizing a light or other electrical component in response to movement of the accessory door from its closed to its open position, and a manually operable override feature is also preferably provided in the event that the user wishes to disable the switch device so as to prevent such energization in response to such opening movement of the door.

In at least some of the preferred embodiments, a disconnect feature is provided for disconnecting the accessory assembly when the visor is pivoted upwardly to its "stored" position (or when the other interior panel is moved to a predetermined position) in order to prevent the light or other electrical component from being energized when not in use while the accessory door is left open. Furthermore, an accessory frame preferably conducts light from one part of the accessory device to another without the need for electrical interconnection therebetween. This feature especially contributes to the up-scaled appearance of the assembly, along with the laterally slidable (non-pivoting) door arrangement.

Additional objects, advantages and features of the present invention will become apparent from the following description and appended claims, taken in conjunction with the accompanying drawings.

BRIEF DESCRIPTION OF THE DRAWINGS

FIG. 3 is an exploded perspective view of the vanity mirror assembly of FIGS. 1 and 2, illustrating various components and subassemblies thereof.

FIG. 5 is an end view of the vanity door of the assembly shown in FIGS. 1 through 3.

FIG. 6 is a cross-sectional view taken generally along line 6—6 of FIG. 5.

FIG. 7 is a cross-sectional view of a vanity frame assembly in another of the preferred embodiments of the invention.

FIG. 8 is a partial cross-sectional view taken generally along line 8—8 of FIG. 3, illustrating an optional disconnect switch in one rotated position.

FIG. 9 is a partial cross-sectional view similar to that of FIG. 8, but illustrating the disconnect switch in another rotated position.

FIG. 10 is a detailed, cross-sectional view of one embodiment of a door switch for a vanity mirror assembly according to the present invention.

FIG. 11 is a detailed, cross-sectional view similar to that of FIG. 10, but illustrating another embodiment of a door switch for a vanity mirror assembly according to the present invention.

FIG. 12 is a partial elevational view similar to that of FIG. 2, but illustrating still another embodiment of the present invention.

FIG. 13 is a partial elevational view similar to that of FIG. 2, but illustrating a vehicle accessory device other than the vanity mirror assembly shown in FIGS. 1 and 2, and illustrating the mounting of the vehicle accessory assembly on an interior vehicle panel other than a visor.

DETAILED DESCRIPTION OF THE PREFERRED EMBODIMENTS

Figure 1:
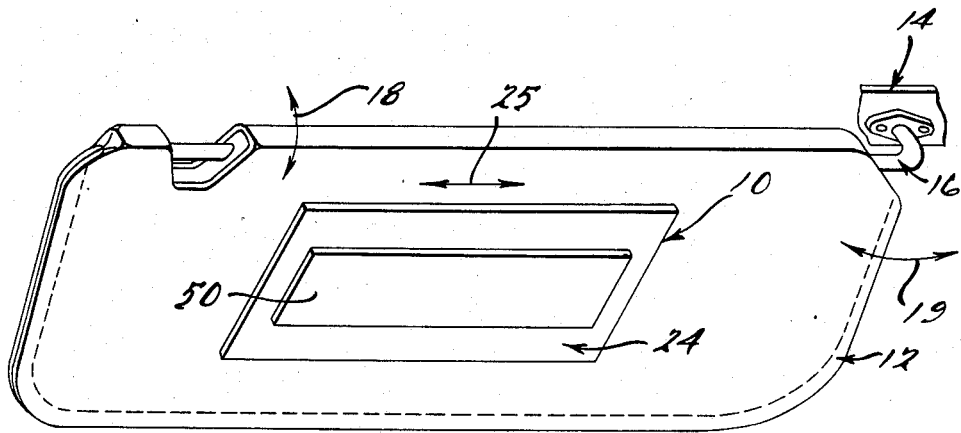
FIG. 1 is a partial elevational view of a vehicle visor shown in its lowered position and incorporating an exemplary vanity mirror assembly according to the present invention.

FIGS. 1 through 13 illustrate various exemplary embodiments of vanity mirror assemblies, mirror and light assemblies, or other vehicle accessory assemblies, mounted generally on a vehicle visor or other vehicle interior panels in accordance with the present invention. From the following discussion, taken in conjunction with the drawings and the appended claims, one skilled in the art will readily recognize that the principles of the present invention can be applied to the mounting of vehicle accessory assemblies other than those shown for purposes of illustration in the drawings, as well as to the mounting of such vehicle accessory assemblies in locations other than on vehicle visors, such as on headliners, interior door panels, or other desired locations in the vehicle interior.

Figure 2:
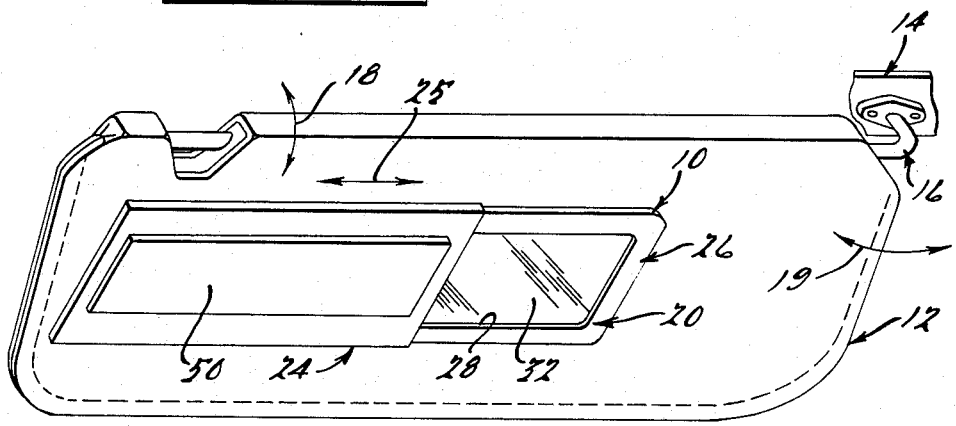
FIG. 2 is a partial elevational view similar to that of FIG. 1, but illustrating the vanity mirror assembly with its vanity door in an open position.

FIGS. 1 through 3 generally illustrate a vanity mirror assembly 10 mounted on one side of a vehicle visor 12, which is typically in turn secured to a vehicle interior 14 by way of a pivot rod 16 for pivotal motion upwardly and downwardly, as well as for pivotal motion from side to side, as indicated generally by pivot arcs 18 and 19, respectively. The vanity mirror assembly 10 generally includes a vanity device 20 and a vanity door 24 slidably interconnected therewith, and thus interconnected with the visor 12, preferably for lateral sliding movement in lateral directions indicated generally by reference numeral 25.

Figure 4:
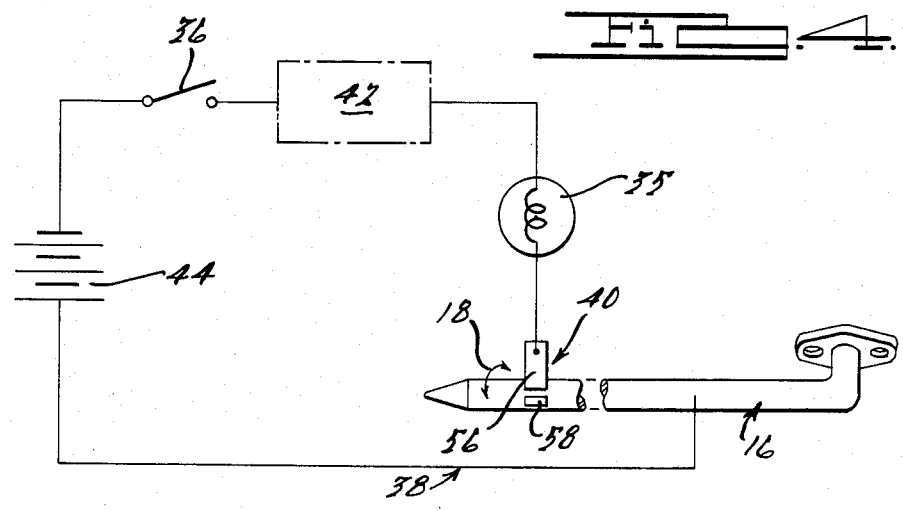
FIG. 4 is a schematic diagram of one preferred embodiment of an electrical system for an accessory assembly according to the present invention.

The exemplary vanity device 20 shown in FIGS. 1 through 3 includes a vanity mirror frame 26, preferably having an opening 28 for a mirror 32, as well as a light assembly 34 having an electrically energizable lamp or other light source 35 (shown in FIG. 3). A power supply system 38, shown generally in FIGS. 3 and 4, is provided in the vanity device 20 for electrically interconnecting the vanity mirror assembly 10 with a vehicle electrical power source 44 illustrated diagrammatically in FIG. 4.

In the preferred embodiments of the invention, the power supply system 38 includes an electrical switch 36 electrically interconnected with the vehicle power source 44 and the lamp or other light source 35 and actuable for electrically energizing the lamp 35 in response to opening movement of the vanity door 24 from its closed position to its open position, and correspondingly actuable for electrically de-energizing the lamp 35 in response to closing movement of the vanity door 24 from its open position to its closed position. Optionally, if desired, a circuit control device 42, shown in phantom lines in FIG. 4, can be included in the power supply system 38 in order to incorporate any of a number of desired light control features, such as a timer device, a dimming and brightening device responsive to interior light conditions, or other electrical functions desired in a particular accessory assembly application.

As shown in FIGS. 5 and 6, the exemplary vanity door 24 includes a pair of channel portions 46 for slidably engaging the edges of the vanity mirror frame 26, and a protrusion 48 for abuttingly engaging the switch 36 in order to energize and de-energize the lamp 35 during lateral opening and closing movement of the vanity door 24, in a manner which is explained in more detail below. The protrusion 48 also preferably engages a protrusion 49 on the frame 26 at the end of its opening movement in order to provide a "stop" to prevent the door 24 from being inadvertently removed from the frame 26. The vanity door 24 can also be provided with a decorative outer panel 50, or other suitable ornamentation for the desired appearance in a particular application.

The vanity mirror frame 26 is preferably composed of a material that is transparent or semi-transparent, such that light emitting from the light assembly 34 and the lamp 35 is conducted along peripheral portions 51 to illuminate the mirror 32, without the necessity of electrical wiring running through the vanity device 20 from the location of the light assembly 34 to the other locations on the vanity mirror frame 26. In this regard, the light assembly 34 can optionally be provided with a light-piping portion 52, the nature of which is well-known to those skilled in the light-conducting or fiber optics art. Preferably, at least the peripheral portions 51 of the vanity mirror frame 26, as well as the light-piping portion 52 of the light assembly 34, are composed of a synthetic material, such as an acrylic material for example. In this regard, it should be noted that the vanity mirror frame 26 and the mirror 32 can be replaced with a substantially one-piece structure 126, shown in FIG. 7, which is integrally formed from the above-mentioned transparent or semi-transparent light-conducting material, having a reflective layer or coating 127 on a central area of its unexposed, inner side in order to define a mirror portion 132 and peripheral frame portions 151. Such an optional construction is believed to be highly advantageous in terms of light conduction from the light assembly 34 or other source of illumination.

As illustrated diagrammatically in FIG. 4, and shown in more detail in FIGS. 8 and 9, the vanity mirror assembly 10 also includes an override or disconnect switch 40, which operates to disconnect the light assembly 34 from the vehicle power source 44 in response to upward movement of the visor 12 to its closed or stored position. The provision of such optional disconnect feature thus allows the user to selectively energize or de-energize the lamp 35 merely by raising or lowering the visor 12 with the vanity door 24 in its open position. Furthermore, the provision of the disconnect switch 40 also prevents the lamp 35 from being inadvertently left on when the visor 12 is pivoted to its upward or stored position while the vanity door 20 is open.

The preferred optional disconnect switch 40 described above includes an electrical contact 56 secured to the visor 12 for pivotal movement therewith and electrically interconnected with the power supply system 38. The pivot rod 16 on the visor 12 is preferably composed of an electrically conductive material and is also electrically interconnected with the power supply system 38. An electrically non-conductive insert member 58 is provided at the periphery of the pivot rod 16 and located at a predetermined circumferential position thereon, such that when the visor is pivoted to its downward, or "open", position, the electrical contact 56 engages the conductive peripheral portion of the pivot rod 16 in order to make electrical contact therebetween, thus allowing the switch 36 and the lamp or other illumination source 35 to be electrically connected with the vehicle power source 44. As the visor 12 is pivotally moved or rotated upwardly to its "stored" position, however, the electrical contact 56 slidably engages the periphery of the pivot rod until it contacts the non-conductive insert 58 in order to disconnect the power supply system 38 from the vehicle power source 44. A functionally similar arrangement can be provided for disconnecting the light or other electrical components in other movable interior panels.

In FIG. 10, the details of one exemplary arrangement for the on-off switch 36 are illustrated. A switch actuation button 60 is provided in a recess 62 of the vanity mirror frame 26 and is laterally movable in lateral directions indicated by reference numeral 64, as well as being movable inwardly and outwardly in directions indicated by reference numeral 66. As the vanity door 24 is slidably moved to its closed position relative to the vanity mirror frame 26, the protrusion 48 engages the actuation button 60 to urge the button 60 inwardly in order to move the switch contact mechanism (not shown) to a disconnected, "off" position, thus de-energizing the source of illumination or other electrical component. As the vanity door 24 is laterally moved to its open position, the protrusion 48 is disengaged from the actuation button 60, thus allowing the button 60 to move outwardly under the influence of a spring or other resilient biasing component of the switch mechanism (not shown), thus functioning to energize the light source. If, however, the user does not desire illumination of the mirror 32, or energization of other electrical components, the actuation button 60 is also movable in the lateral direction 64 to an "off" position, which prevents the switch 36 from energizing the lamp 35 in response to opening movement of the vanity door 24, thus manually overriding the switch 36.

FIG. 11 illustrates another embodiment of the vanity mirror assembly having a switch 236 that is generally similar in many respects to the switch 36 described above, and therefore has its components indicated by reference numerals similar to those for the switch 36, but with two-hundred prefixes. In the switch 236 shown in FIG. 11, the actuation button 260 is movable inwardly and outwardly in directions 266 in order to selectively energize and de-energize the lamp or other electrical component on the accessory assembly in response to opening and closing movement, respectively, of the door 224, by way of mutually engaging or disengaging a pair of electrical contacts 268 and 270, which are electrically interconnected with the power supply system 238. The actuation button 260 is slidably movable along a rod or pin 272 and is biased outwardly by a spring or other resilient biasing component 274, which resiliently biases the actuation button 260 into a position wherein the electrical contacts 268 and 270 are in mutual electrical contact with one another. The rod 272 is pivotally mounted on the vanity mirror frame 226 for pivotal motion about a pivot pin 276 generally in a direction indicated by reference numeral 264. Thus, if the user elects to manually override the functioning of the switch 236 in response to opening and closing movement of the door 224, the actuation button 260 can be pushed inwardly against the outward resilient biasing force of the spring 274, and pivoted laterally until a pair of protrusions 278 and 280 on the actuation button 260 and the frame 226, respectively, interferingly engage one another in order to releasably retain the actuation button 260 in its inward position with the electrical contacts 268 and 270 disengaged from one another.

FIG. 12 illustrates another embodiment of the present invention, wherein a vanity mirror assembly 310 is generally similar to the vanity mirror assembly 10 described above, with corresponding or similar components of the vanity mirror assembly 310 being indicated by reference numerals similar to those of the vanity mirror assembly 10, but having three-hundred prefixes. The vanity device 320 of the vanity mirror assembly 310 includes a transparent or semi-transparent lens member 384 disposed in a lens opening 330 in the vanity mirror frame 326. The lens member 384 substantially covers a lamp or other illumination source (not shown) and can optionally be integrally formed as a one-piece structure with the light-conducting vanity mirror frame 326, in lieu of the separate lens member 384 shown for purposes of illustration in FIG. 12.

FIG. 13 illustrates another exemplary alternate embodiment of the present invention, wherein a vehicle accessory assembly 410 is illustrated for mounting on a vehicle interior panel 412 of a vehicle interior 414 other than on a visor assembly. In the vehicle accessory assembly 410, the vanity device 20 described above in connection with the vanity mirror assembly 10 is replaced by an audio accessory arrangement 410, for example. One skilled in the art will readily recognize that other vehicle accessory devices can also be alternately included in the vehicle accessory assembly 410, and that a mirror or mirror-and-light vanity assembly can also be mounted on a vehicle interior panel other than a visor. In many other respects, the various components of the vehicle accessory assembly 410 are generally similar in configuration or in function to the corresponding components of the embodiments described above. Therefore, such corresponding components are indicated by similar reference numerals having four-hundred prefixes.

The foregoing discussion discloses and describes exemplary embodiments of the present invention. One skilled in the art will readily recognize from such discussion, and from the accompanying drawings and claims, that various changes, modifications, and variations may be made therein without departing from the spirit and scope of the invention as defined in the following claims.

What is claimed is:

1. A vehicle accessory assembly adapted for mounting on an interior vehicle panel that is movable between a first panel position and a second panel position, said accessory assembly comprising: an accessory device interconnectable with the interior vehicle panel at a generally fixed location thereon; an accessory door interconnectable with the interior vehicle panel for slidable lateral movement relative to said accessory device generally parallel to the interior vehicle panel between a closed position wherein said accessory device is substantially covered and an open position wherein said accessory device is substantially exposed; power supply means for electrically interconnecting said accessory assembly with a vehicle electrical power source, said accessory device including at least one electrically energizable electric component, said accessory assembly further including switch means electrically interconnected with said power supply means and said electric component for electrically energizing said electric component in response to said movement of said accessory door from said closed position to said open position; said accessory assembly further including disconnect means for disconnecting said accessory assembly from the vehicle electrical power source when the interior vehicle panel is in said first panel position; and a selectively operable switch override means selectively overriding said switch means and said disconnect means for selectively preventing said electrical energization of said electric component regardless of the position of said accessory door and regardless of the position of said interior vehicle panel; said electric component including a light source having an electrically energizable lamp and a light lens substantially covering said lamp, said lamp and said lens being located at said first location generally at one side of said accessory device, and said accessory assembly further including a light-conducting means having a light-conducting member extending away from said lamp and said lens to said second location on said accessory device in order to illuminate said accessory device at said second location.

2. A vehicle accessory assembly adapted for mounting on an interior vehicle panel, said accessory assembly comprising: an accessory device interconnectable with the interior vehicle panel at a generally fixed location thereon; an accessory door interconnectable with the interior vehicle panel for slidable lateral movement relative to said accessory device generally parallel to the interior vehicle panel between a closed position wherein said accessory device is substantially covered and an open position wherein said accessory device is substantially exposed; and power supply means for electrically interconnecting said accessory assembly with a vehicle electrical power source, said accessory device including at least one electrically energizable light source electrically interconnected with said power supply means, said light source being located at a first location on said accessory device, and light-conducting means for conducting light from said light source to a second location on said accessory device away from said first location in order to illuminate said accessory device at said second location, and said light-conducting means including an accessory frame extending away from said light source along at least a substantial portion of the periphery of said accessory device generally from said first location to said second location, said accessory frame being composed of a light-conducting material that is at least semi-transparent in order to illuminate said accessory device at said second location.

3. A vehicle accessory assembly adapted for mounting on an interior vehicle panel, said accessory assembly comprising: an accessory device interconnectable with the interior vehicle panel at a generally fixed location thereon; an accessory door interconnectable with the interior vehicle panel for slidable lateral movement relative to said accessory device generally parallel to the interior vehicle panel between a closed position wherein said accessory device is substantially covered and an open position wherein said accessory device is substantially exposed; and power supply means for electrically interconnecting said accessory assembly with a vehicle electrical power source, said accessory device including at least one electrically energizable light source electrically interconnected with said power supply means, said light source being located at a first location on said accessory device, and light-conducting means for conducting light from said light source to a second location on said accessory device away from said first location in order to illuminate said accessory device at said second location, and said light source including an electrically energizable lamp and a light lens substantially covering said lamp, said lamp and said lens being located at said first location generally at one side of said accessory device, said light-conducting means including a light-conducting member extending away from said lamp and said lens to said second location on said accessory device in order to illuminate said accessory device at said second location.

4. A vehicle accessory assembly according to claim 3, wherein said light-conducting member includes an accessory frame extending away from said lamp and said lens along at least a substantial portion of the periphery of said accessory device in order to illuminate said accessory device at said second location.

5. A vehicle accessory assembly according to claim 3, wherein said accessory door is slidably movable from said closed position to said open position in a lateral opening direction such that said one side of said accessory device is substantially exposed first upon initial movement of said accessory door in said lateral opening direction, said accessory door being selectively positionable in an intermediate lateral position wherein said lamp and said lens are substantially exposed and wherein said second location on said accessory device is substantially covered.

6. A vanity assembly adapted for mounting on a vehicle visor that is movable between a first visor position and a second visor position, said vanity assembly comprising: a vanity device including at least a vanity mirror interconnectable with the vehicle visor at a generally fixed location thereon; a vanity door interconnectable with the vehicle visor for slidable lateral movement relative to said vanity device generally parallel to the vehicle visor between a closed position wherein said vanity mirror is substantially covered and an open position wherein said vanity mirror is substantially exposed; power supply means for electrically interconnecting said vanity assembly with a vehicle electrical power source, said vanity device including at least one electrically energizable electric component, said vanity assembly further including switch means electrically interconnected with said power supply means and said electric component for electrically energizing said electric component in response to said movement of said vanity door from said closed position to said open position; said vanity assembly further including disconnect means for disconnecting said vanity assembly from the vehicle electrical power source when the vehicle visor is in said first visor position; and a selectively operable switch override means selectively overriding said switch means and said disconnect means for selectively preventing said electrical energization of said electric component regardless of the position of said vanity door and regardless of the position of said vehicle visor; said electric component including a light source having an electrically energizable lamp and a light lens substantially covering said lamp, said lamp and said lens being located at said first location generally at one side of said vanity device, and said light-conducting means including a light-conducting member extending away from said lamp and said lens to said second location on said vanity device in order to illuminate said vanity device at said second location.

7. A vanity assembly adapted for mounting on a vehicle visor, said vanity assembly comprising: a vanity device including at least a vanity mirror interconnectable with the vehicle visor at a generally fixed location thereon; a vanity door interconnectable with the vehicle visor for slidable lateral movement relative to said vanity device generally parallel to the vehicle visor between a closed position wherein said vanity mirror is substantially covered and an open position wherein said vanity mirror is substantially exposed; and power supply means for electrically interconnecting said vanity assembly with a vehicle electrical power source, said vanity device including at least one electrically energizable light source electrically interconnected with said power supply means, said light source being located at a first location on said vanity device, and light-conducting means for conducting light from said light source to a second location on said vanity device away from said first location in order to illuminate said vanity device at said second location, and said light-conducting means including a vanity mirror frame extending away from said light source along at least a substantial portion of the periphery of said vanity mirror generally from said first location to said second location, said accessory frame being composed of a light-conducting material that is at least semi-transparent in order to illuminate said vanity mirror at said second location.

8. A vanity assembly adapted for mounting on a vehicle visor, said vanity assembly comprising: a vanity device including at least a vanity mirror interconnectable with the vehicle visor at a generally fixed location thereon; a vanity door interconnectable with the vehicle visor for slidable lateral movement relative to said vanity device generally parallel to the vehicle visor between a closed position wherein said vanity mirror is substantially covered and an open position wherein said vanity mirror is substantially exposed; and power supply means for electrically interconnecting said vanity assembly with a vehicle electrical power source, said vanity device including at least one electrically energizable light source electrically interconnected with said power supply means, said light source being located at a first location on said vanity device, and light-conducting means for conducting light from said light source to a second location on said vanity device away from said first location in order to illuminate said vanity device at said second location, and said light source having an electrically energizable lamp and a light lens substantially covering said lamp, said lamp and said lens being located at said first location generally at one side of said vanity device, and said vanity mirror being located at said second location generally at an opposite side of said vanity device, said light-conducting means including a light-conducting member extending away from said lamp and said lens to said second location on said vanity device in order to illuminate said vanity device at said second location.

9. A vanity assembly according to claim 8, wherein said light-conducting member includes a vanity mirror frame extending away from said lamp and said lens along at least a substantial portion of the periphery of said vanity mirror in order to illuminate said vanity mirror at said second location.

10. A vanity assembly according to claim 8, wherein said vanity door is slidably movable from said closed position to said open position in a lateral opening direction such that said lamp and said lens at said one side of said vanity device is substantially exposed first upon initial movement of said vanity door in said lateral opening direction, said vanity door being selectively positionable in an intermediate lateral position wherein said lamp and said lens are substantially exposed and wherein said vanity mirror at said second location on said vanity device is substantially covered.

11. A vanity assembly according to claim 10, wherein said light-conducting member and said lens are integrally formed as a one-piece structure composed from a light-conducting material that is at least semi-transparent.

12. A vanity assembly adapted for mounting on a vehicle visor, said vanity assembly comprising: a vanity device including at least a vanity mirror interconnectable with the vehicle visor at a generally fixed location thereon; a vanity door interconnectable with the vehicle visor for slidable lateral movement relative to said vanity device generally parallel to the vehicle visor between a closed position wherein said vanity mirror is substantially covered and an open position wherein said vanity mirror is substantially exposed; and power supply means for electrically interconnecting said vanity assembly with a vehicle electrical power source, said vanity device including at least one electrically energizable light source electrically interconnected with said power supply means, said light source being located at a location on said vanity device that is substantially covered by said vanity door regardless of the position of said vanity door, and light-conducting means for conducting light from said light source to said vanity mirror, said light-conducting means includes a vanity mirror frame composed of a light-conducting material that is at least semi-transparent, said vanity mirror frame extending along a substantial portion of the periphery of said vanity mirror in order to illuminate said vanity mirror, said vanity mirror and said vanity mirror frame being substantially exposed when said vanity door is in said open position.

13. A vanity assembly according to claim 12, wherein said vanity mirror and said vanity mirror frame are integrally formed as a one-piece structure composed of said light-conducting material and having an inner and an outer surface, a central portion of said inner surface of said one-piece structure being covered with a reflective material to form a vanity mirror portion of said one-piece structure, and a peripheral portion of said one-piece structure generally surrounding said central portion being uncovered to form a vanity mirror frame portion of said one-piece structure.

14. A vanity assembly adapted for mounting on an interior vehicle panel, said vanity assembly comprising:
a vanity device including a vanity mirror, at least one electrically energizable light source, a light-conducting vanity mirror frame disposed generally adjacent said light source extending along at least a substantial portion of the periphery of said vanity mirror in order to conduct light thereto from said light source, and power supply means for electrically interconnecting said vanity device with a vehicle electrical power source, said vanity device being interconnectable with the interior vehicle panel at a generally fixed location thereon;
a vanity door interconnectable with the interior vehicle panel for slidable lateral movement relative to said vanity device generally parallel to the interior vehicle panel between a closed position wherein said vanity device is substantially covered and an open position wherein said at least a portion of said vanity device is substantially exposed; and switch means electrically interconnected with said power supply means and said light source for electrically energizing said light source in response to movement of said vanity door from said closed position to said open position and for de-energizing said light source in response to movement of said vanity door from said open position to said closed position.

15. A vanity assembly according to claim 14, further including selectively operable switch override means for selectively disabling said switch means in order to selectively prevent said electrical energization of said light source in response to said movement of said vanity door from said closed position to said open position.

16. A vanity assembly according to claim 14, wherein said light source includes an electrically energizable lamp and a light lens substantially covering said lamp, said lamp and said lens being located at said first location generally at one side of said vanity device, said vanity door being slidably movable from said closed position to said open position in a lateral opening direction such that said one side of said vanity device is substantially exposed first upon initial movement of said vanity door in said lateral opening direction, said vanity door being selectively positionable in an intermediate lateral position wherein said lamp and said lens are substantially exposed and wherein said vanity mirror and said vanity mirror frame are substantially covered.

17. A vanity assembly adapted for mounting on a vehicle visor interconnectable with a vehicle interior for movement between a first visor position and a second visor position, said vanity assembly comprising:

a vanity device including a vanity mirror, at least one electrically energizable light source, a light-conducting vanity mirror frame disposed generally adjacent said light source extending along at least a substantial portion of the periphery of said vanity mirror in order to conduct light thereto from said light source, and power supply means for electrically interconnecting said vanity device with a vehicle electrical power source, said vanity device being interconnectable with the interior vehicle panel at a generally fixed location thereon;

a vanity door interconnectable with the interior vehicle panel for slidable lateral movement relative to said vanity device generally parallel to the interior vehicle panel between a closed position wherein said vanity device is substantially covered and an open position wherein said at least a portion of said vanity device is substantially exposed;

switch means electrically interconnected with said power supply means and said light source for electrically energizing said light source in response to movement of said vanity door from said closed position to said open position and for de-energizing said light source in response to movement of said vanity door from said open position to said closed position; and disconnect means for disconnecting said vanity device from the vehicle electrical power source when the vehicle visor is in said first visor position.

18. A vanity assembly according to claim 17, further including selectively operable switch override means for selectively disabling said switch means in order to selectively prevent said electrical energization of said light source in response to said movement of said vanity door from said closed position to said open position.

19. A vanity assembly according to claim 17, wherein said light source includes an electrically energizable lamp and a light lens substantially covering said lamp, said lamp and said lens being located at said first location generally at one side of said vanity device, said vanity door being slidably movable from said closed position to said open position in a lateral opening direction such that said one side of said vanity device is substantially exposed first upon initial movement of said vanity door in said lateral opening direction, said vanity door being selectively positionable in an intermediate lateral position wherein said lamp and said lens are substantially exposed and wherein said vanity mirror and said vanity mirror frame are substantially covered.

20. A vanity assembly according to claim 17, wherein the vehicle visor includes a pivot rod securable to the vehicle interior, said pivot rod having an electrically conductive peripheral portion and an electrically non-conductive peripheral portion thereon, said electrically conductive peripheral portion being electrically interconnected with the vehicle electrical power source, the vehicle visor being pivotally mounted on said pivot rod for pivotal movement relative thereto between the first and second visor positions, said disconnect means including an electrical contact member secured to the vehicle visor for pivotal movement therewith and electrically interconnected with said power supply means, said electrical contact member slidably engaging said pivot rod as the vehicle visor is pivotally moved relative thereto, said electrical contact member engaging said non-conductive peripheral portion of said pivot rod in order to electrically disconnect said vanity device from the vehicle electrical power source when said vehicle visor is in said first visor position, and said electrical contact member engaging said conductive peripheral portion of said pivot rod in order to make electrical contact therewith and to electrically connect said vanity device to the vehicle electrical power source when the vehicle visor is in said second visor position.

* * * * *

UNITED STATES PATENT AND TRADEMARK OFFICE
CERTIFICATE OF CORRECTION

PATENT NO. :   4,791,537

DATED     :   December 13, 1988

INVENTOR(S) :   Fisher, et al

It is certified that error appears in the above-identified patent and that said Letters Patent is hereby corrected as shown below:

On Page 2 under "U.S. Patent Documents", "4,653,793 3/1987 White et al" should be —4,653,798 3/1987 White et al—.

In the Abstract, line 3, "devce" should be —device—.

Signed and Sealed this

Twelfth Day of December, 1989

*Attest:*

JEFFREY M. SAMUELS

*Attesting Officer*          Acting Commissioner of Patents and Trademarks